(No Model.)
W. J. BARRINGER.
SHINGLE JOINTING MACHINE.
No. 453,365.          Patented June 2, 1891.
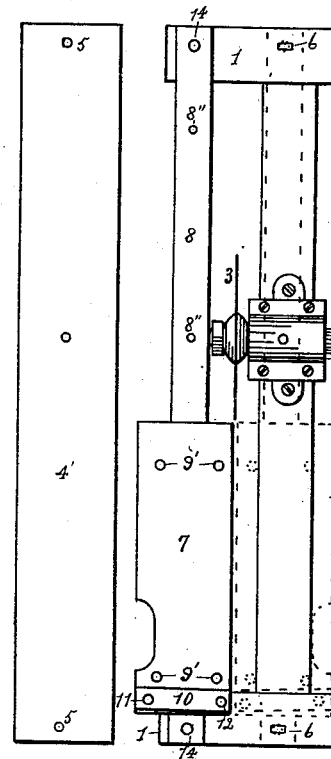
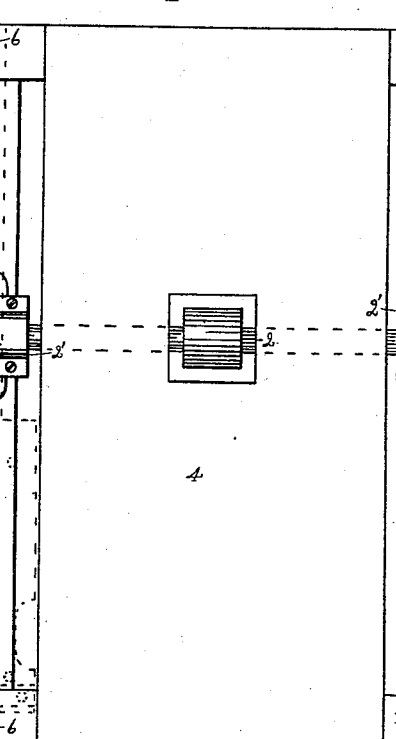
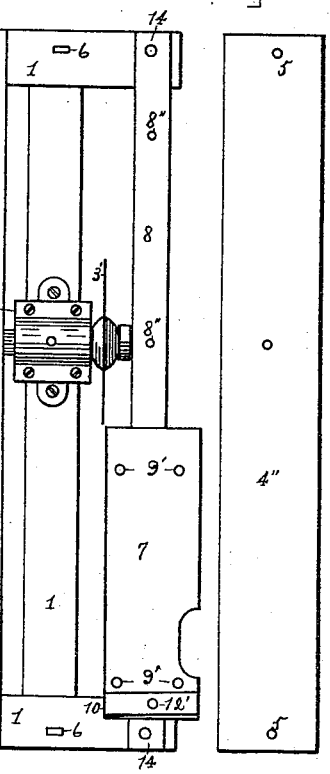
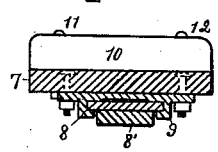
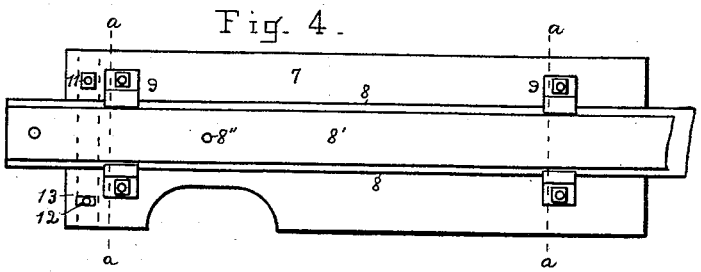

UNITED STATES PATENT OFFICE.

WILLIAM J. BARRINGER, OF PESHTIGO, WISCONSIN.

SHINGLE-JOINTING MACHINE.

SPECIFICATION forming part of Letters Patent No. 453,365, dated June 2, 1891.

Application filed November 18, 1890. Serial No. 371,827. (No model.)

*To all whom it may concern:*

Be it known that I, WILLIAM J. BARRINGER, a citizen of the United States, residing at Peshtigo, in the county of Marinette and State of Wisconsin, have invented a new and useful Improvement in Shingle-Jointing Machines, of which the following is a specification.

My invention relates to an improvement in the carriage, a shingle-stop thereon, and a track for said carriage, whereby they are adapted for use and to be quickly moved to and adjusted in position upon either the right or left hand side of the saw, the object of it being to provide an adjustable stop for giving various degrees of taper to shingles and also to accommodate the operator in his acquired habit as a right or left hand knot-sawyer. I attain said objects by means of the device illustrated in the accompanying drawings, in which—

Figure 1 is a plan of a shingle-jointing or knot-saw frame, an arbor arranged in journal-boxes thereon and having a saw upon each end of said arbor, one of my improved carriages and tracks upon the outer side of each of said saws, and upon the right-hand side of the left-hand saw in dotted lines is shown its carriage removed from the left to the right hand side of said saw and thereby adapting the machine for two right-handed knot-sawyers. Figs. 2 and 3 are removable parts of the top or table for covering a portion of the right and left hand end of the arbor, respectively; Fig. 4, a plan upon an enlarged scale of the bottom side of the carriage and a portion of its track, and Fig. 5 a vertical section upon a like scale of said carriage and track upon the lines *a a* of Fig. 4.

Similar figures of reference indicate like parts in the several views.

The figure 1 represents a shingle-jointer or knot-saw frame; 2, a saw-arbor journaled in the journal-boxes 2' and having the saws 3 3' one upon each end thereof; 4, 4', and 4'', a top or table for the frame, the parts 4' 4'' being removed from the frame, but being adapted to be secured in position thereon by means of a bolt through the holes 5 in the end of each of the parts 4' 4'' and through the slot 6 in the frame 1, the part 4' filling the space between the saw 3 and piece 4 of the table and the part 4'' the space between the saw 3' and said piece 4.

7 is the carriage-top upon which the shingles to be jointed are placed, and 8 the track upon which said carriage is arranged to slide, the parts 7 and 8, with their respective attachments, comprising my invention and being intended for application to knot-saw or shingle-jointing-machine frames in general upon which a saw is used, although differing in construction from the one here shown.

The carriage consists of the piece 7, having two gibs 9 9, secured thereon upon its lower side with the bolts 9', and having upon its upper side near its rear end the shingle-stop 10, against which the butt-ends of the shingles to be jointed are to bear. The stop is secured near each of its ends to the outer and inner edges of the carriage by the respective bolts 11 and 12, the latter one being provided with a slot 13 (the slot may be either in the stop 10 or carriage-top 7) for the purpose of allowing a movement of the free end of the stop longitudinally with the carriage, so that it may be secured in position upon the carriage and its face or forward side may lie with reference to the track and also to the saw nearest to said carriage at an angle less than a right angle. The butts of the shingles in the process of jointing bearing against the stop may thus be jointed with a small degree of taper toward their points, the amount of said taper being easily made more or less by changing the position of the free end of said stop and securing when properly adjusted with the bolt 12. The nut upon the end of the bolt 12 is omitted in Fig. 4 for more plainly showing the slot 13 in the piece 7. It will be evident that said stop may be made adjustable by means of a single bolt 12' near its middle, as is shown in the right-hand carriage of Fig. 1, and any desired angle with the plane of the saw produced by turning the stop upon its central pivot, when it may be secured in the desired position by screwing up said bolt. In the first-described method the stop is less likely to become displaced, and is therefore preferable. The track 8 for said carriage is composed of two pieces 8 and 8', riveted together with rivets 8'', and forming thereby a single rail, and is secured to the frame 1 with bolts 14, one near each of its ends. For cheapness in making this track, I prefer to make it of a piece of flat bar-iron 8′ and a piece of flat bar-steel 8, of a width exceeding the width of the piece 8′, and riveting them together, so as to leave a lip or projection of the edges of the bar 8 over the edges of the bar 8′, over which lips the gibs 9 are inclosed. The object of these lips is to give steadiness to the carriage while quick reciprocating movements are being made and to prevent its getting off its track and onto the saw. The last-named result may be prevented by a lip upon only one side of the track, but is not generally as effectual as one upon each side. The track may, however, be made of a single piece of material and the lips formed by planing off the surplus material in a well-known manner. The gibs 9 for fitting the track illustrated I make of the form shown and secure them to the piece 7 with the bolts 9′.

For changing the track and carriage from one side of the saw to the other the track is moved and bolted to the frame with bolts through the slots 6 (the slots permitting the adjustment of the track to a position parallel with the plane of the saw) and the gibs 9 9 and stop 10 removed and secured to the carriage-piece 7 upon its opposite side, the bolts 9′, 11, 12, or 12′ and their respective holes being adapted for and made use of in making said change.

As before mentioned, the top or table is composed of three pieces, the piece 4 being secured upon the frame 1 in any convenient manner and the parts 4′ 4″ made detachable and secured to the frame 1 with bolts, as described, or with some other convenient attachment. Upon the removal of one of the detachable pieces 4′ or 4″, for the purpose of changing the carriage to the opposite side of the saw, said detachable piece may be transferred to the other side of the saw and receive the edgings cut from the shingles in jointing them, and thereby serve a like purpose as before its transfer.

Having described my invention, what I claim, and desire to secure by Letters Patent, is—

1. In combination with a shingle-jointing or knot saw, a carriage and track therefor, said track consisting of a single rail, and the carriage being provided upon one side thereof with gibs for sliding upon said track, and having upon its opposite side, near its rear end, a shingle-stop, said gibs and stop being each changeable to the opposite side of said carriage, and said track and carriage thereby adapted for use upon either the right or left hand side of said saw, substantially as described.

2. In combination with a shingle-jointing or knot saw, a carriage and track therefor, said track consisting of a single rail, and the carriage being provided upon one side thereof with gibs for sliding on said track, and having upon its opposite side, near its rear end, a shingle-stop, said stop being adjustable, whereby its face or forward side may be arranged at any desired angle with said track, said gibs and stop being each changeable to the opposite side of said carriage, and said track and carriage thereby adapted for use upon either the right or left hand side of said saw, substantially as set forth and shown.

WILLIAM J. BARRINGER.

Witnesses:
H. J. SIMON,
W. W. HALL.